United States Patent [19]

Biggs

[11] Patent Number: 4,750,469
[45] Date of Patent: Jun. 14, 1988

[54] METHOD AND SYSTEM FOR ENHANCING THE EFFICIENCY OF BARBECUE GRILL SYSTEMS

[76] Inventor: Duane L. Biggs, 11541 Ruggles, Omaha, Nebr. 68164

[21] Appl. No.: 41,094

[22] Filed: Apr. 22, 1987

Related U.S. Application Data

[63] Continuation-in-part of Ser. No. 904,036, Apr. 9, 1986, abandoned.

[51] Int. Cl.⁴ .................... A47J 37/07; F24B 13/02
[52] U.S. Cl. ........................... 126/25 R; 126/9 R; 126/25 C; 99/447
[58] Field of Search .............. 126/9 R, 9 B, 25 R, 126/25 A, 25 C, 41 R, 337, 338, 170, 171, 176, 177, 39 J; 99/447; 431/347

[56] References Cited

U.S. PATENT DOCUMENTS

| | | | |
|---|---|---|---|
| 1,337,043 | 4/1920 | Child | 99/49 |
| 1,657,683 | 1/1928 | Martineau | 126/176 R |
| 2,746,378 | 5/1956 | Lang | 99/447 |
| 4,279,240 | 7/1981 | Artusy | 126/419 |
| 4,630,593 | 12/1986 | Gremillion | 126/25 R |

Primary Examiner—Margaret A. Focarino
Attorney, Agent, or Firm—James D. Welch

[57] ABSTRACT

A method and system of enhancing the efficiency of barbecue grill systems which comprises the placement of an apparatus in a barbecue grill system above the bed which hold charcoal, but below the grill upon which food is placed for cooking. The apparatus is constructed from materials which are not subject to easy degradation by heat produced by burning charcoal and comprises a system of a frame into which are pivotally mounted a multiplicity of louvers, which louvers are divided into multiple separate groups. The louvers in each group are interconnected by a linkage mechanism which allows an operator to control the angle at which the louvers are set, said angle being continuously variable between verticle and essentially horizontal. The direct access of the heat produced by burning charcoal to the grill is, hence, subject to control by an operator. Such control allows optimizing the heat presented to food cooking on a grill, as well as allow the extinguishing of flare-ups.

6 Claims, 1 Drawing Sheet

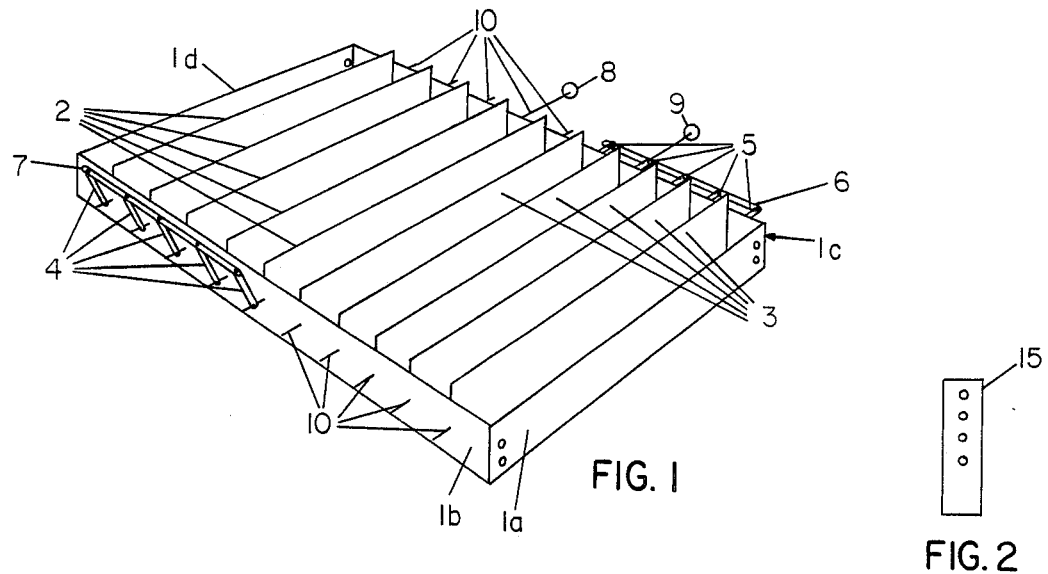
FIG. 1
FIG. 2
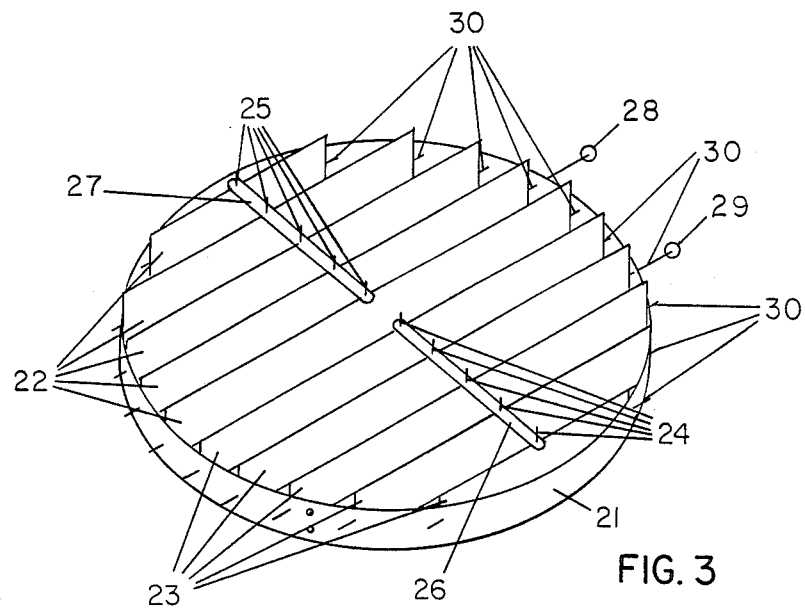
FIG. 3
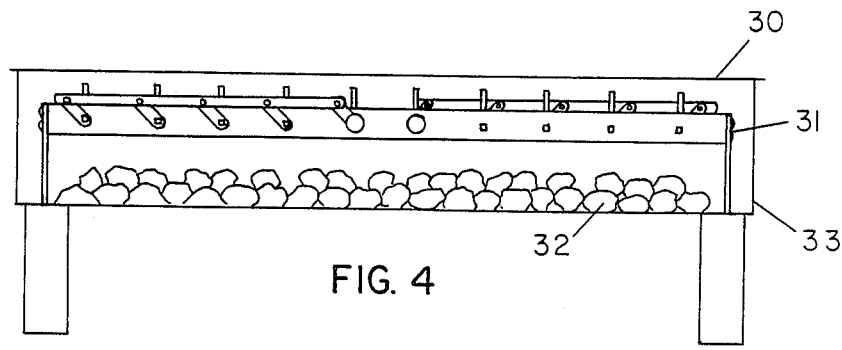
FIG. 4

METHOD AND SYSTEM FOR ENHANCING THE EFFICIENCY OF BARBECUE GRILL SYSTEMS

The subject matter of this application is the continuation-in-part of patent application Ser. No. 06/904,036 filed Apr. 9, 1986 which is now abandoned.

TECHNICAL FIELD

This invention pertains to Barbecue grill systems and more particularly to a method and system for enhancing the efficiency of same.

BACKGROUND OF THE INVENTION

Conventional Barbecue grill systems basically consist of a bed upon which charcoal or an equivalent, hereinafter referred to as charcoal, is placed, a grill located above the charcoal bed upon which food is placed for cooking and a framework for holding the components together. During use conventional barbecue grill systems are subject to problems exemplified by the fire produced by the burning charcoal becoming too hot, and flare ups caused by dripping grease or fat accumulating on the charcoal and suddenly igniting. These effects cause non-optimum cooking conditions.

Prior attempts to overcome such problems involved the placing of a wire mesh screen above the charcoal. In particular patents to Gremillion and Lang, U.S. Pat. Nos. 4,630,593 and 2,746,378 respectively use this approach.

The mesh screen becomes hot during use and any fat or grease dripping thereon is burned immediately, thereby preventing buildup and flare-ups due to sudden ignition.

While the inventions in Gremillion and Lang have merrit, it must be acknowledged that mesh wire screen made of relatively thin wire will eventually burn through if exposed to heat for any length of time, hence the lifetime of the effectiveness of the inventions alluded to is limited. Also, while the inventions in Gremillion and Lang arguable cause a more even presentation of heat produced by the burning charcoal in a barbecue grill system, they do not allow for placing a solid barrier between said charcoal and the grill upon which food is placed for cooking, and no operator control of the effect is provided for.

A need exists for a barbecue grill system efficiency enhancing system which has essentially limitless lifetime and which provides for an operator controlled solid barrier to be placed between the burning charcoal and the grill. Such a system would preferrable allow for adjustment between a condition of essentially no barrier to one of a complete barrier. In addition, when the barrier is in place, it should allow radiant heat to continue to reach the grill so as to keep cooking food warm while, for instance, an operator leaves the grill unattended to answer a phone etc.

DISCLOSURE OF THE INVENTION

The method and system of the present invention meets the needs pointed out in the Background section. The barbecue grill system efficiency enhancing system comprises a frame which contains a multiplicity of louvers pivotally mounted to the frame, which louvers can be caused to rotate about their longitudinal mid-point axis so as to assume a vertical position, each louver being parallel to the other louvers; or an essentially horizontal position in which the louvers form an essentially solid barrier by contact with the louvers on each side thereof; or any position inbetween. The motion of the louvers is controlled by an operator, via a linkage mechanism, and the frame, louvers and linkage mechanisms are constructed from materials which are not degraded by heat produced by burning charcoal.

During use the louvers can be positioned by an operator to be vertical, essentially horizontal or so as to assume a position inbetween. When vertical the heat from burning charcoal can access food on the barbecue grill system directly, and when the louvers are positioned essentially horizontal the direct heat from burning charcoal will be blocked, while radiant heat from the heated louvers will have access to food on the grill. The louvers can be momentarily positioned essentially horizontal to extinguish a flare-up, or can be positioned essentially horizontal when an operator must leave the barbecue grill system unattended for a time to answer a phone etc.

The louvers can be rotated to a position between vertical and essentially horizontal to provide a combination of direct heat from burning charcoal, and radiant heat from the heated louvers for use in the cooking of foods such as corn on the cob and potatoes. The equivalent effect is commonly achieved by wrapping such foods in metal foil presently.

Finally, the present invention provides multiple groups of louvers, each group being interconnected within itself by seperate linkage mechanisms. This allows different portions of the grill to be accessed by different forms of heat. This is important when, for instance, direct access to heat from burning charcoal is desired to cook meat, while at the same time radiant heat from the heated louvers, which are situated essentially horizontal, is required to keep cooked potatoes and corn warm, for example.

The method of use of the barbecue grill system efficiency enhancing system comprises obtaining a barbecue grill system efficiency enhancing system and mounting it in a conventional barbecue grill system, then operating it as alluded to already.

SUMMARY OF THE INVENTION

Examination of existing barbecue grill systems and prior patents in the relevant art, has shown there to be a need for an operator controlled means to enhance the efficiency of barbecue grill systems. The method and system of the present invention meets the need by placing apparatus in a conventional barbecue grill system which comprises a frame, which frame contains a multiplicity of louvers, which louvers are pivotally attached to the frame, and which louvers are interconnected by a linkage mechanism which causes the louvers interconnected to move in unison when caused to move by an operator. In addition, the present invention provides multiple groups of independant louvers, each group being interconnected internally by separate linkage mechanisms.

Operator action can cause the louvers in a group of louvers to be oriented vertically, essentially horizontally, or at any angle in between. The heat from burning charcoal, hence, can have direct access to food cooking on a grill, or radiant heat from the heated louvers can replace said direct access, or a combination of direct access, and radiated heat can be arranged.

An object of the present invention is to provide a safe economical system that can control the direct access of heat produced by burning charcoal in a conventional barbecue grill system, to food placed upon the grill in said system.

Another object of the present invention is to provide a means by which radiant heat can be presented to food cooking on a barbecue grill system grill in place of, or in addition to, that provided by burning charcoal directly.

A specific object of the present invention is to provide a means by which flare-ups caused by dripping grease and fat spontaneously igniting, can be extinguished. In particular, an operator can, when a flare-up occures, rotate the louvers to an essentially horizontal position until the flames burn themselves out.

Another specific object of the present invention is to provide a means by which an operator can block direct access of heat produced by burning charcoal to food cooking on the grill of a barbecue grill system while leaving the barbecue grill system unattended.

BRIEF DESCRIPTION OF THE DRAWINGS

FIG. 1 is a perspective view of a rectangular shaped system for enhancing the efficiency of a barbecue grill system.

FIG. 2 is front elevational view of a leg for the system to enhance the efficiency of a barbecue grill system.

FIG. 3 is a perspective view of a circular shaped system for enhancing the efficiency of a barbecue grill system.

FIG. 4 is a composite side elevational view of a barbecue grill system in which is mounted a system to enhance the efficiency of barbecue grill systems.

DETAILED DESCRIPTION

Referring now to FIG. 1, it is shown that a square or rectangular frame is comprised of side pieces labeled (1a) (1b) (1c) and (1d). The sides can be portions of one piece of material. Sides (1b) and (1c) are shown with holes drilled therein, into which pivot rods (10) insert, said pivot rods being attached to louvers (2) and (3). The louvers are sectioned into two groups so that half may be controlled independently of the other half. Vertical elements (4) and (5) project from the pivot rods (10) in each group and connecting bars (6) and (7) serve to interconnect the vertical elements so that when one pivot rod is rotated, all louvers in the associated group also rotate. The resulting mechanism allows an operator to impart rotation to control elements (8) and (9) which in turn causes the associated louvers to rotate in unison from a fully vertical position to an essentially horizontal position. In the later position the louvers form an essentially solid continuium of metal.

FIG. 2 shows a leg (15) with a multiplicity of holes therein. Four such legs attach to the frame shown in FIG. 1 and holes for such mounting are shown at the sides of frame side piece (1a). The multiplicity of holes in the frame side piece and in the legs allow adjustment of the length beneath the frame to which the legs extend. Other means for effective leg length adjustment are possible as well, and the means shown is intended as an example of one such means.

Also to be noted is that the side pieces and louvers can be made of any length so that the final result will fit into an existing barbecue grill system.

FIG. 3 shows a similar apparatus to that in FIG. 1, except that the side pieces are replaced by a circular or oval frame designated as a whole by (21). Two groups of louvers are shown (22) and (23), which louvers connect to pivot rods (30), which pivot rods extend through holes in the circular arc frame (21). Vertical elements (24) and (25) connect to louvers in groups (22) and (23) and are interconnected by connecting bars (26) and (27) respectively. Control elements (28) and (29) allows an operator to separately cause louvers in groups (22) and (23) respectively to rotate in unison from a fully verticall position to an essentially horizontal position similar to that described with respect to the apparatus in FIG. 1. Metal legs, as shown in FIG. 2 are also attached to the frame in a fashion as described with respect to the frame shown in FIG. 1. The diameter of the circular frame and the length of the variuous louvers can be made so that the resulting apparatus can easily fit into existing barbecue grill systems.

FIG. 4 shows a barbecue grill system designated as a whole by (33), into which has been placed a system for enhancing the efficiency of barbecue grill systems designated as a whole as (31). Also designated are the grill (30) and charcoal (32).

Having hereby disclosed the subject matter of this invention, it should be obvious that many modifications, substitutions, and variations of the present invention are possible in light of the teachings. It is therefore to be understood that the invention may be practised other than as specifically described, and should be limited in breadth and scope only by the appended claims.

I claim:

1. A system for enhancing the efficiency of barbecue grill systems, which system for enhancing the efficiency of barbecue grill systems mounts in a barbecue grill system which comprises a means for supporting charcoal, upon which means charcoal is placed during use, and a grill which is positioned vertically above the means for supporting charcoal; which system for enhancing the efficiency of barbecue grill systems horizontally in the vertical space between the means for supporting charcoal thereon and the charcoal thereon during use below, and the grill above, directly below the portion of the grill which is to be enhanced in efficiency; which system for enhancing the efficiency of barbecue grill systems comprises a frame with a multiplicity of holes therein, into which holes pivot rods insert, which pivot rods are attached to rectangular shaped louvers, which rectangular shaped louvers are divided into a multiplicity of groups, the rectangular shaped louvers in each group being interconnected by separate linkage mechanisms and control elements such that when a control element is rotated it causes all rectangular shaped louvers in its group to rotate in unison through a range from essentially horizontal to vertical.

2. A system for enhancing the efficiency of barbecue grill systems as in claim 1, which further comprises legs which attach to the frame in a fashion such that their length below the frame can be extended or decreased.

3. A system for enhancing the efficiency of barbecue grill systems as in claim 1, in which the frame is square or rectangular in shape.

4. A system for enhancing the efficiency of barbecue systems as in claim 1, in which the frame is circular or oval in shape.

5. A system for enhancing the efficiency of barbecue grill systems as in claim 1, in which the linkage mechanism comprises vertical elements which attach to and project from the pivot rods or rectangular shaped louvers, which vertical elements pivotally connect via a connecting bar and control elements, such that when the control element is rotated all rectangular shaped louvers in a group rotate in unison.

6. A method of enhancing the efficiency of barbecue grill systems which comprises:

Obtaining a system for enhancing the efficiency of barbecue grill systems which comprises a frame with a multiplicity of holes therein, into which holes pivot rods mount, which pivot rods are attached to louvers, which louvers are divided into a multiplicity of groups, the louvers in each group being interconnected by separate linkage mechanisms and control elements such that when a control element is rotated it causes all louvers in its group to rotate in unison through a range of essentially horizontal to vertical;

Placing the system for enhancing the efficiency of barbecue grill systems into a barbecue grill system, which barbecue grill system comprises a means for supporting charcoal, upon which means charcoal is placed during use, and a grill, which grill is located vertically above the means for supporting charcoal, so that the system for enhancing the efficiency of barbecue grill systems is horizontally in the vertical space between the means for supporting charcoal and the charcoal thereon during use below, and the grill above, directly under the portion of the grill to be enhanced in efficiency; and Operating the system for enhancing the efficiency of barbecue grill systems so as to rotate the louvers through a range of from an essentially horizontal position to a vertical position as determined optimum by an operator.

* * * * *